(12) United States Patent
Chenneviere et al.

(10) Patent No.: US 12,254,614 B2
(45) Date of Patent: Mar. 18, 2025

(54) METHOD FOR DETECTING GLASS-CERAMIC MATERIALS

(71) Applicant: SAINT-GOBAIN ISOVER, Courbevoie (FR)

(72) Inventors: Hugues Chenneviere, Colombes (FR); Ezzeddine Ouerghemmi, Antony (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 616 days.

(21) Appl. No.: 17/604,647

(22) PCT Filed: Apr. 9, 2020

(86) PCT No.: PCT/EP2020/060247
§ 371 (c)(1),
(2) Date: Oct. 18, 2021

(87) PCT Pub. No.: WO2020/212266
PCT Pub. Date: Oct. 22, 2020

(65) Prior Publication Data
US 2022/0196544 A1    Jun. 23, 2022

(30) Foreign Application Priority Data

Apr. 19, 2019   (FR) ....................... 1904247

(51) Int. Cl.
*G06T 7/00*       (2017.01)
*G06T 7/90*       (2017.01)

(52) U.S. Cl.
CPC .............. *G06T 7/0008* (2013.01); *G06T 7/90* (2017.01); *G06T 2207/10024* (2013.01)

(58) Field of Classification Search
CPC ............ G06T 7/0014; G06T 7/00; G06T 7/90
See application file for complete search history.

(56) References Cited

U.S. PATENT DOCUMENTS

| 8,436,268 B1 * | 5/2013 | Afsari | ..................... B07C 5/366 |
| | | | 209/580 |
| 2004/0251178 A1 * | 12/2004 | Afsari | ..................... B07C 5/342 |
| | | | 209/582 |

(Continued)

FOREIGN PATENT DOCUMENTS

| IT | 202000007345 A1 * | 10/2021 | ............. B07C 5/342 |
| JP | 2004305965 A    * | 11/2004 | |
| KR | 101090772 B1 * | 12/2011 | ........... B07C 5/3422 |

OTHER PUBLICATIONS

Bonifazi, G., et al., "Imaging spectroscopy based strategies for ceramics glass contaminants removal in glass recycling," Waste Management, vol. 26, No. 6, Jan. 2006. pp. 627-639. (Copy in file from IDS) (Year: 2006).*

(Continued)

*Primary Examiner* — Ross Varndell
(74) *Attorney, Agent, or Firm* — Pillsbury Winthrop Shaw Pittman LLP

(57) ABSTRACT

An automated method for detecting glass-ceramic materials in cullet, includes detecting the glass-ceramic material in cullet, during which fragments thought to be glass-ceramic material are identified in the cullet, obtaining a digital image resulting from the detecting of the glass-ceramic material, the image including at least one group of pixels corresponding to a fragment thought to be glass-ceramic material, colorimetrically processing the image, during which at least the group of pixels of the image corresponding to fragments thought to be glass-ceramic material is processed by a colorimetric image processing module according to an RGB model.

7 Claims, 4 Drawing Sheets

(56) References Cited

U.S. PATENT DOCUMENTS

Figure 1:
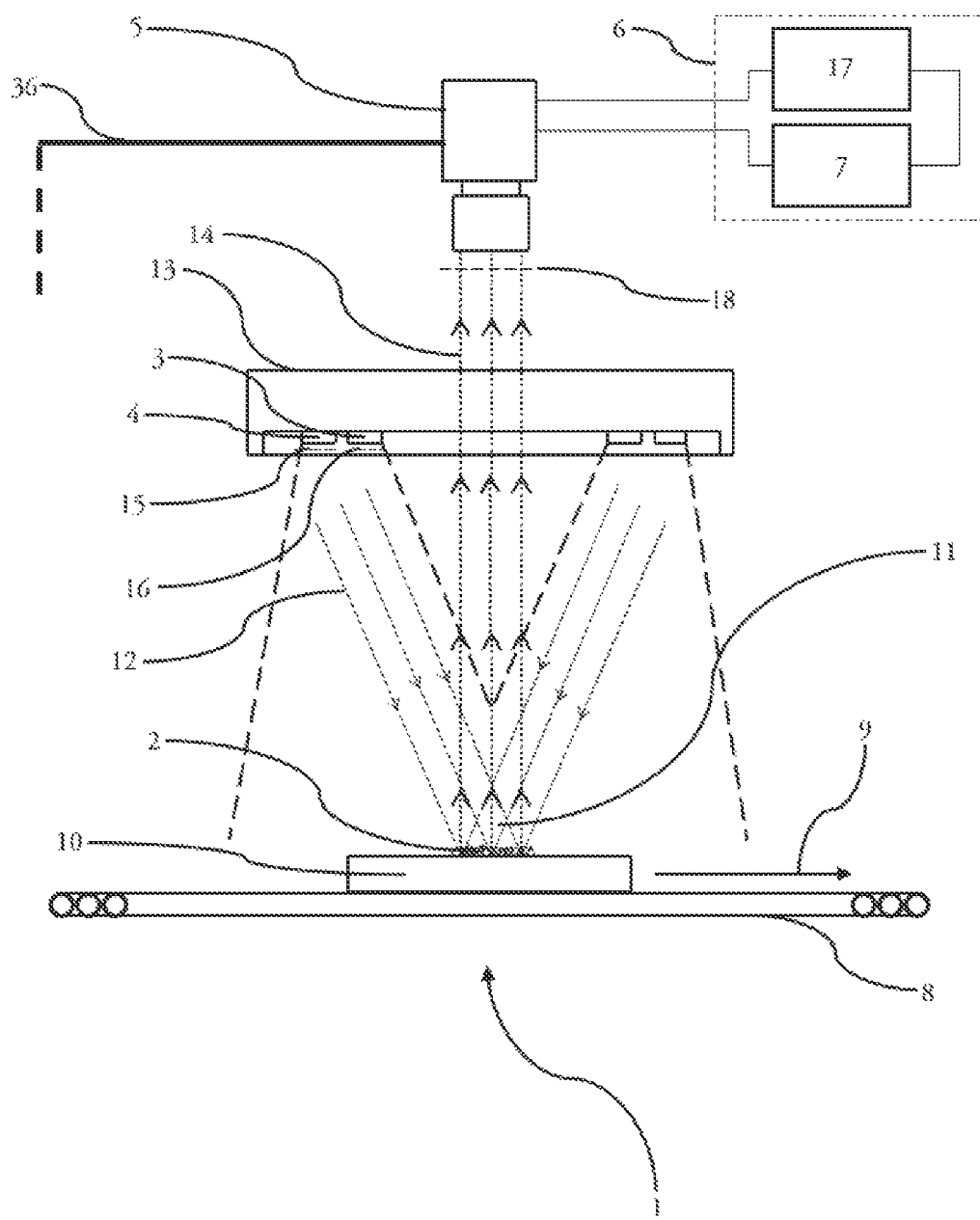

| | | | |
|---|---|---|---|
| 2007/0029233 A1* | 2/2007 | Reinhold | B07C 5/3416 |
| | | | 209/578 |
| 2015/0219312 A1* | 8/2015 | Llaluet | F21K 9/90 |
| | | | 356/416 |
| 2016/0281961 A1* | 9/2016 | Laluet | C03C 4/02 |
| 2019/0194054 A1* | 6/2019 | Siebers | F24C 15/10 |

OTHER PUBLICATIONS

International Search Report as issued in International Patent Application No. PCT/EP2020/060247, dated Jul. 16, 2020.

Bonifazi, G., "Classical imaging and digital imaging spectrophotometric techniques in cullets (glass fragments) sorting," Proceedings of SPIE, vol. 5608, Oct. 2004, pp. 264-277.

Bonifazi, G., et al., "Imaging spectroscopy based strategies for ceramics glass contaminants removal in glass recycling," Waste Management, vol. 26, No. 6, Jan. 2006, pp. 627-639.

Osman, G., et al., "Enhanced Skin Colour Classifier Using RGB Ratio Model," International Journal on Soft Computing (IJSC), vol. 3, No. 4, Nov. 2012, 14 pages.

* cited by examiner

METHOD FOR DETECTING GLASS-CERAMIC MATERIALS

CROSS-REFERENCE TO RELATED APPLICATIONS

This application is the U.S. National Stage of PCT/EP2020/060247, filed Apr. 9, 2020, which in turn claims priority to French patent application number 1904247 filed Apr. 19, 2019. The content of these applications are incorporated herein by reference in their entireties.

The present invention relates to an automated method for detecting materials of the glass-ceramic type among a sample of fragments of glass, or cullet. The invention relates to the field of the industry of manufacturing glass-based products.

Samples of glass fragments, or cullet, are used to manufacture various glass products. For example, in the field of insulation, glass fibers are commonly used, obtained largely from cullet. Cullet can also be used in the manufacture of bottles and other glass containers.

The manufacture of fiberglass takes place according to a method consisting first of all in heating the cullet, in a glass furnace, to a temperature sufficient to melt the glass, i.e. about 1500° C. The molten glass is then conducted into a centrifugation device of the fiberizing plate type, resulting in the creation of fibers that are sized on their passage to a conveyor on which they are then dried, cured and shaped.

Due to user sorting errors, the cullet may contain not only glass, but also other materials, including glass-ceramic materials. These glass-ceramic materials, which have properties different from those of glass, can cause significant problems in the manufacturing methods of cullet-based products by damaging the machines and/or by causing defects in the products.

By way of example, in the manufacture of glass fibers as presented above, the glass-ceramic materials, which have a melting point of about 1700° C., are not melted in the glass furnace, in which the glass is melted at 1500° C. When, to obtain glass fibers, the molten material leaving the furnace is introduced into an internal centrifugation device of the fiberizing plate type, the pieces of glass-ceramic material contained in the molten glass block the holes in the fiberizing plate, the diameter of which may in particular be less than 1 mm. The entire production chain must then be stopped.

When manufacturing bottles and containers based on cullet, the pieces of glass-ceramic material present in the cullet can cause local fragilities on the obtained products and/or esthetic problems.

Several systems or methods exist for detecting glass-ceramic material among cullet, in various ways. When fragments of the cullet are detected as being glass-ceramic fragments, they are removed from the cullet by a device for expelling given fragments of the cullet. The detection accuracy of this type of system or method is not perfect, however, and due to similarities in their structure or visual appearance, fragments of the cullet that are not glass-ceramic fragments are sometimes detected as being glass-ceramic fragments. These fragments, which may be qualified as false positives, are then removed from the cullet even though their properties, such as their melting temperature, for example, are quite suitable for manufacturing glass fibers, hollow glass or flat glass. These fragments are therefore eliminated unnecessarily, which leads to a waste of raw material on an industrial scale. No solution currently exists to improve the reliability of the detection of glass-ceramic material among a cullet.

The present invention makes it possible to correct errors that may lead to the elimination of glass fragments that are not glass-ceramic fragments.

It consists of an automated method process for detecting materials of the glass-ceramic type among a cullet, characterized in that it comprises the following steps:
- a step of detecting the glass-ceramic material in cullet, during which fragments thought to be glass-ceramic material are identified in the cullet,
- a step of obtaining a digital image resulting from the preceding step of detecting the glass-ceramic material, said image particularly comprising at least one group of pixels corresponding to a fragment thought to be glass-ceramic material,
- a step of colorimetrically processing the image, during which at least the group of pixels of said image corresponding to fragments thought to be glass-ceramic material is processed by a colorimetric image processing module according to an RGB model.

According to the invention, this colorimetric processing step makes it possible to check the detection quality of the glass-ceramic material detection step and to check whether the fragments thought to be glass-ceramic material do in fact correspond to glass-ceramic material and not to another type of glass.

The step of detecting the glass-ceramic material in the cullet can be performed by any method. It can be a colorimetric, shading or other method. During this detection step, part of the cullet is thought to be fragments likely to be glass-ceramic material, and the rest of the method aims to confirm this prior identification.

Thus, the step of detecting the glass-ceramic material makes it possible to identify a part of the cullet as being thought to be fragments of glass-ceramic material, and the step of obtaining an image makes it possible to obtain an image in which one or more pixels are identified as corresponding thought to be fragments. In particular, an image of the cullet can be acquired by a camera and associated with information relating to the location of the pixels corresponding to the fragments thought to be glass-ceramic material. Alternatively, when the step of detecting the glass-ceramic material already involves acquiring an image, obtaining a digital image identifying the fragments thought to be glass-ceramic material may consist in processing the image to form the outline of the pixels corresponding to the fragments thought to be glass-ceramic material.

In all cases, it is important according to the invention for a digital image to be sent to a colorimetric processing module according to an RGB model, with identification of the pixels or groups of pixels corresponding to the presence in the cullet of fragments thought to be glass-ceramic material.

The pixel is the basic unit used to define the quality of a digital image. In other words, it corresponds to a precise point of the image. The number of pixels in the image depends on the resolution of an image acquisition device chosen to be integrated into the method. As was specified above, "pixels corresponding to fragments thought to be glass-ceramic material" is understood to mean that in the processed image, at least one area has been identified that corresponds to a fragment of glass-ceramic material in the cullet.

However, as mentioned above, the fragments thought to be glass-ceramic material may not actually be fragments of glass-ceramic material. The third step of the method makes it possible to conduct this verification. The digital image obtained with identification of the pixels corresponding to the fragments thought to be glass-ceramic material is therefore reprocessed by means of a colorimetric image processing module according to an RGB model. The RGB model is a color definition model whose acronym stands for Red Green Blue. The RGB model is based on the value of three data defining each of the shades of color in the visible domain. Each color is defined according to the datum corresponding to the value of each of the three primary colors used to define this color, namely the red datum R, the green datum G and the blue datum B. Each of the RGB data is between 0 and 255. The progression of this step of the method will be described in more detail below.

As has been specified, according to the invention, the colorimetric image processing module according to an RGB model converts at least the pixels of the image resulting from the detection of fragments of glass-ceramic material into RGB data. The RGB model colorimetric image processing module can convert the entire processed image to RGB data.

According to one feature of the invention, during the colorimetric image processing step, the colorimetric image processing module according to an RGB model processes only the pixels corresponding to fragments thought to be glass-ceramic material. It should be understood here that the method according to the invention makes it possible to check a prior detection of fragments of glass-ceramic material in cullet in the sense that it makes it possible to verify that fragments thought to be glass-ceramic material are indeed fragments of glass-ceramic material. The method according to the invention does not seek to carry out a second detection step in order to detect, if necessary, fragments of glass-ceramic material that have escaped the detection systems during a previous step. In this context, and advantageously, the method is thus provided so that the colorimetric image processing module according to an RGB model converts into RGB data only the part of the image that is necessary to check the prior detection according to the invention, that is to say, to check that the identified fragments are indeed glass-ceramic material. Focusing this checking step only on the pixels corresponding to the fragments of glass-ceramic material thus limits the duration of the additional colorimetric processing by the RGB model.

According to one feature of the invention, the colorimetric image processing module according to an RGB model processes the pixels or groups of pixels converted into RGB data only by considering the red R and blue B data of the RGB model. As mentioned earlier, the RGB model corresponds to a set of three data. Nevertheless, the inventors have demonstrated by various tests that only the R and B data are of interest during the verification of the image comprising pixels corresponding to fragments thought to be glass-ceramic material. This allows the colorimetric image processing module according to an RGB model to be configured only to calculate the red R and blue B data of the RGB model, deliberately omitting the calculation of the green datum G, and therefore to calculate only two data instead of three, thus increasing the execution speed and therefore the efficiency of the method.

According to one feature of the invention, the colorimetric image processing module according to an RGB model calculates the ratio $$\frac{B}{R}$$

between the blue datum B and the red datum R for each pixel or groups of pixels corresponding to fragments of the cullet having been thought to be fragments of glass-ceramic material. The ratio $$\frac{B}{R}$$

corresponds to a ratio between the blue and red data found in the images taken or in the fragments of the cullet revealed as being fragments of glass-ceramic material. The ratio between the blue and red data makes it possible to distinguish between the glass-ceramic material and the fragments that are not glass-ceramic fragments, but that were thought to be as such by the initial detection step in the cullet, also called false positives, as will be explained later. In the light of what has been described, it is understood that it is well-advised to proceed with the conversion into RGB data only of the pixels of the processed image that correspond to the fragments thought to be fragments of glass-ceramic material after analysis of the image during the first processing step, in order to avoid calculating too many ratios later.

According to one feature of the invention, the colorimetric image processing module according to an RGB model compares the ratios $$\frac{B}{R}$$

between the blue datum B and the red datum R as they were calculated beforehand to a threshold value. The inventors have observed that the ratios could be compared with a threshold value carefully chosen to distinguish glass-ceramic material from false positives.

According to one feature of the invention, the threshold value is 0.5. This value of 0.5 was determined by the inventors because it leaves no room for doubt; the fragments of cullet relating to the pixels or groups of pixels having a value greater than the threshold value of 0.5 as the ratio of blue data B to red data R are confirmed to be glass-ceramic fragments.

Among the different types of glass detected as positive, glass-ceramic material is the only type of glass other than transparent glass with a ratio $$\frac{B}{R}$$

greater than the threshold value of 0.5. Conventional clear glass also las a ratio $$\frac{B}{R}$$

greater than 0.5 because it is close to 1, but conventional clear glass cannot be likened to fragments of glass-ceramic material during the first step of the method. Glass-ceramic material is therefore the only type of glass exhibiting the following two conditions: being positive during the first step of the method, and exhibiting a ratio $$\frac{B}{R}$$

greater than 0.5.

By analogy, it can be deduced that the fragments of cullet relating to the pixels or groups of pixels having a value lower than the threshold value of 0.5 as ratio $$\frac{B}{R}$$

between a blue datum B and a red datum R are no longer considered to be fragments of glass-ceramic material, but rather to be false positives, which therefore do not need to be released from the cullet.

By way of example, the fragments of glass used for wine or champagne bottles have optical properties approaching the optical properties of glass-ceramic material, such that they may be thought to be fragments of glass-ceramic material during the first step of the method and may constitute false positives. However, glass fragments likely to be considered as false positives, such as glass fragments used for wine or champagne bottles, have a ratio $$\frac{B}{R}$$

between 0.07 and 0.23. Calculating the ratio $$\frac{B}{R}$$

of the pixels or groups of pixels corresponding to these fragments, then comparing with the threshold value of 0.5 makes it possible to eliminate any doubt as to their true nature.

According to one feature of the invention, the step of detecting the glass-ceramic material is carried out by colorimetric analysis. The term "colorimetric analysis" refers to all types of processing modules making it possible to obtain a correspondence of the shades of color appearing in an acquired image in numbered or lettered data.

According to one feature of the invention, the step of detecting the glass-ceramic material is carried out by colorimetric image processing according to an HSV model. By way of nonlimiting example, the step of detecting the glass-ceramic material can be a method of detecting the glass-ceramic material by colorimetric processing according to an HSV model. The colorimetric processing according to an HSV model is carried out on an image of the cullet acquired by an image acquisition device, for example a camera.

The HSV color space, in French TSV, is an acronym meaning Hue Saturation Value. Each datum of these three terms makes it possible to define any shade of color in the visible domain.

"Hue" is a term that can be represented by a circle and is defined by a data range from 0 to 360°. Each degree represents a hue, according to the following table:

| Degree | Hue |
| --- | --- |
| 0° | Red |
| 60° | Yellow |
| 120° | Green |
| 180° | Cyan |
| 240° | Blue |
| 300° | Magenta |
| 360° | Red |

"Saturation" is a term between 0 and 1, reflecting the notion of amount of color. A saturation approaching 0 will tend to be less intense, while a saturation approaching 1 will be more saturated.

The value is also a term between 0 and 1, reflecting the notion of shine or luminance. Any datum with a value equal to 0 is associated with a black color. The closer the value is to 1, the lighter the associated color will be.

All the different HSV data can be represented by a cone of revolution, within which all the shades of visible color can be converted into HSV terms and all correspond to a point on the area of this cone of revolution. Hue is the circumference of the cone, Saturation is the radius of the cone, and Value is the height of the cone.

The colorimetric image processing module according to an HSV model processes the images acquired by the image acquisition device by considering only one datum of the HSV model, and more particularly only the datum H of this HSV model. As mentioned previously, the HSV model corresponds to a set of three data. Nevertheless, the inventors have demonstrated by various tests that only the Hue H is a datum of interest during the analysis of the cullet by the present detection method. This allows the detection method to be configured so as to only calculate the datum for the Hue H of the HSV model, and therefore to calculate only one datum instead of three, thus increasing the execution speed and therefore the efficiency of the method.

The colorimetric processing according to an HSV model is carried out by determining a single datum per pixel or group of pixels of the analyzed image, then by comparison with a range of data.

The precision of the processing may vary depending on the need and/or the size of the cullet. Image processing can therefore be performed for each pixel of the image captured by the image acquisition device in order to ensure better precision.

The processing can also be done by a group of pixels in order to process a set of pixels with less precision, but a faster processing speed. The use of one or the other of the analysis modes depends on factors such as the size of the cullet fragments, the number of fragments, or the risk of stacking the fragments on top of each other in the cullet deposited on the reflective surface.

The colorimetric processing according to an HSV model is thresholded around an HSV hue datum H of between 50° and 70° with S=1 and V=0.5. The colorimetric processing according to an HSV model makes it possible for fragments of cullet to be thought to be glass-ceramic fragments. After the light sources are actuated to direct their radiation onto the surface of the cullet, the light reflected by the image acquisition device is captured and this same image undergoes colorimetric processing by an HSV model, the processed image is analyzed and fragments of the cullet may or may not appear to be a certain color. Indeed, depending on the lighting conditions during the implementation of the detection method, the glass-ceramic fragments appear of a certain color on the image captured and processed according to an HSV model, which differentiates them from the rest of the cullet. Theoretically, the glass-ceramic exhibits a color specific to itself during the implementation of the detection method on cullet.

The thresholding of the colorimetric processing is based on the color reflected by the glass-ceramic when exposed to the rays emitted simultaneously by the two types of light sources. Due to the presence of metal oxides in its composition, glass-ceramic material absorbs some of the ultraviolet rays that it receives. These metal oxides absorb ultraviolet rays and corresponding crystals scatter blue light; this is why glass-ceramic material is in theory the only type of glass that appears yellow when cullet is analyzed during the detection method, hence the choice of this threshold. After colorimetric processing, the calculation module can thus be configured to consider that any pixel or group of pixels whose hue H is between 50° and 70° is glass-ceramic material.

The invention also covers a system for implementing the detection method described above, comprising a module for detecting the glass-ceramic material and a colorimetric image processing module according to an RGB model. Similarly to the method, the system for implementing this method comprises a module for detecting the glass-ceramic material that can be of any nature. The colorimetric image processing module according to an RGB model takes care of the step of verifying the fragments detected as positive in the same way as described above, independent of the nature of the module for detecting glass-ceramic materials.

The invention also relates to a facility for manufacturing glass fibers, hollow glass or flat glass comprising at least one glass furnace and forming stations, in which cullet is poured into the glass furnace to obtain molten glass intended to supply the forming stations, said facility comprising a system for implementing the detection method as described above, said implementation system being positioned on the path of the cullet toward the glass furnace.

Figure 2:
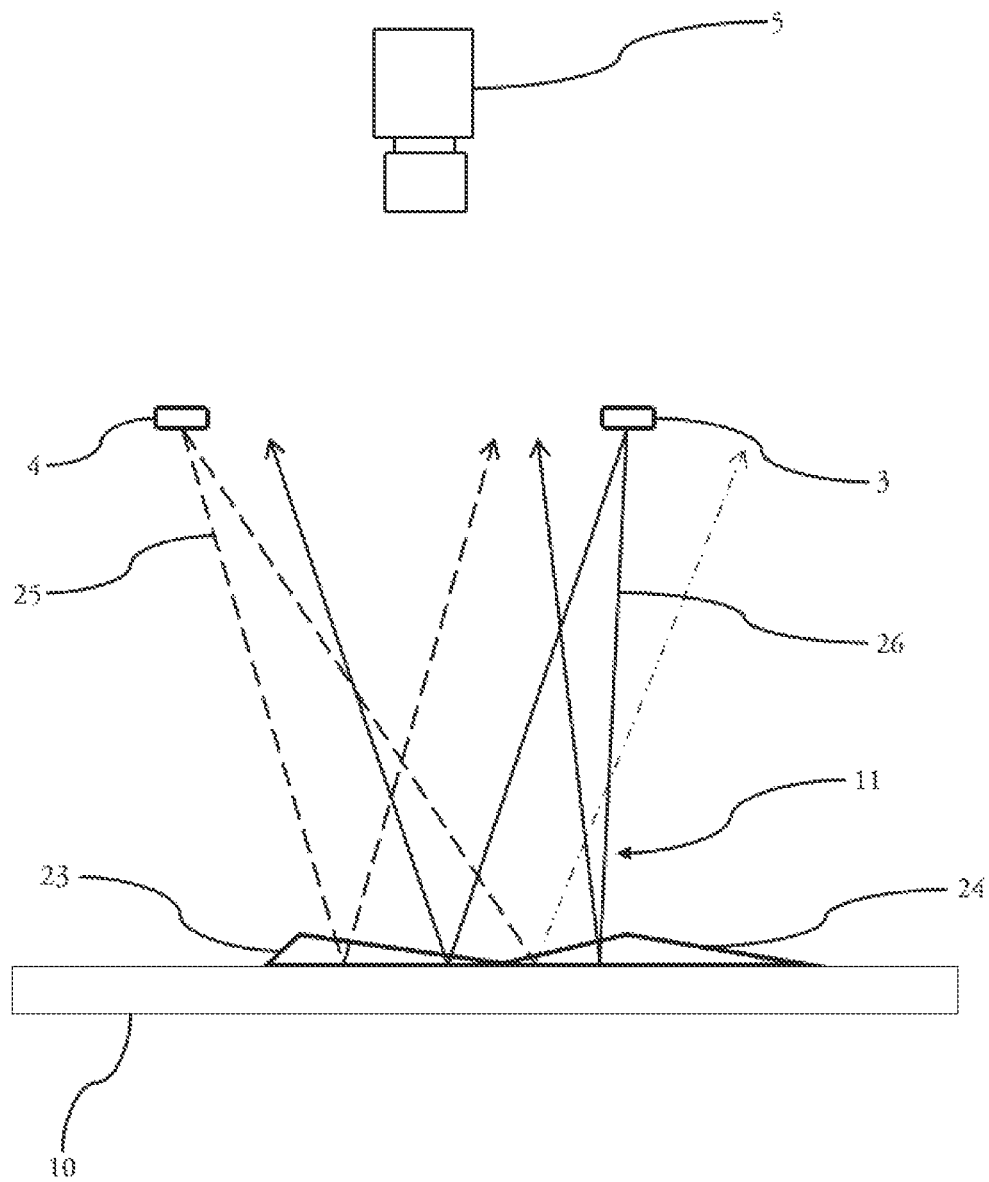
Figure 3:
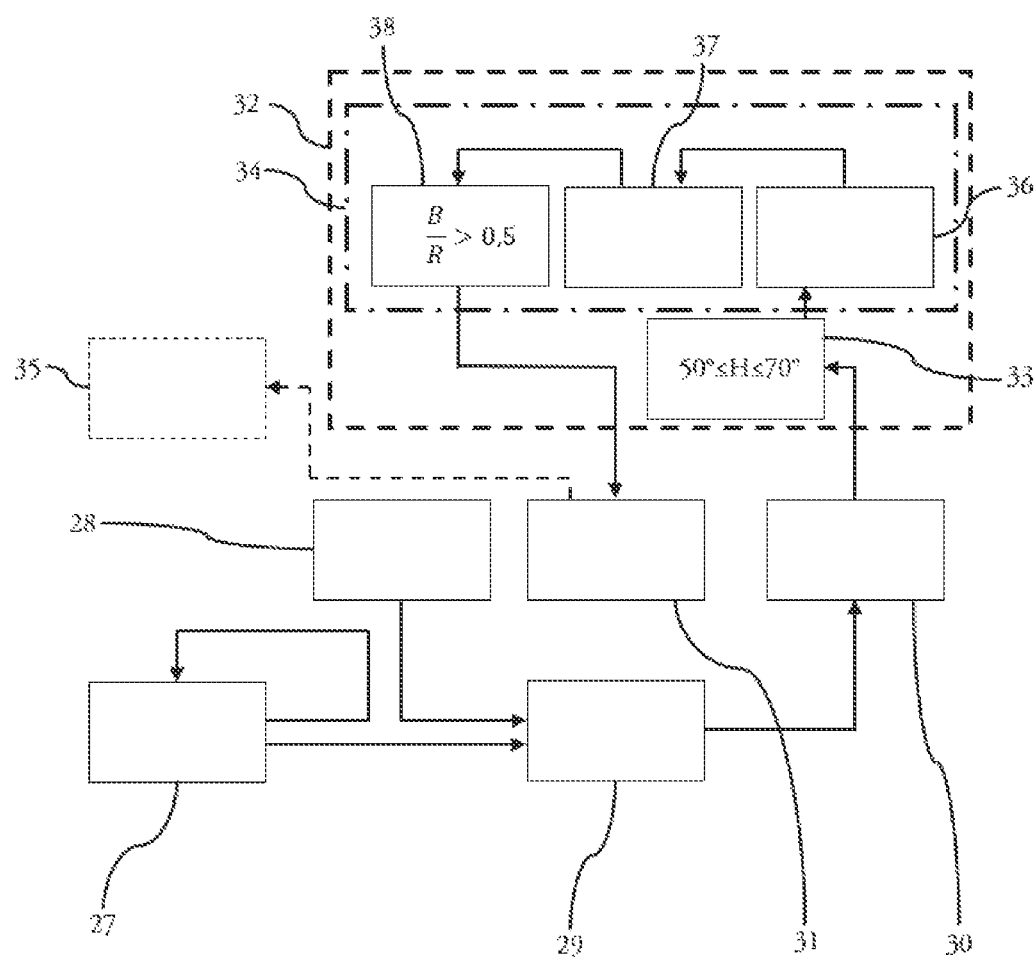

Other features and advantages of the invention will appear both from the description which follows and from several exemplary embodiments, which are given for illustrative purposes and without limitation with reference to the appended schematic drawings, in which:

FIG. 1 is a schematic representation of the detection system according to one embodiment of the invention, FIG. 2 is a schematic representation of the behavior of the radiation of the light sources of the system on a fragment of common glass and on a fragment of glass-ceramic material, FIG. 3 is a schematic representation of the detection method implemented by the system described above, FIG. 4 is a graph showing the percentage of light transmission of different types of glass as a function of the wavelength of the received light.

By way of non-exhaustive example, the detection system taken as an example here comprises a colorimetric processing module according to an HSV model. It is this processing module that detects the glass-ceramic material.

FIG. 1 represents a detection system 1 according to the invention. This system 1 comprises two types of light sources, including a first type corresponding to a white light source 3 and a second type corresponding to a monochromatic ultraviolet-type light source 4. The white light source(s) 3 and the monochromatic ultraviolet-type light source(s) 4 are attached to a structure 13 that supports the light sources and comprises means for supplying electrical energy. An image acquisition device 5 overhangs the structure 13. In the illustrated example, the image acquisition device 5 is supported by an attachment means 36, but it can also be directly integrated within the structure 13.

The light rays emitted by the white light source 3 are filtered directly by a polarizer 16, in order to limit the light intensity and to avoid stray reflections, which can be processed subsequently. The rays emitted by the monochromatic ultraviolet-type source 4 are in turn filtered by a band-pass filter 15 centered at 365 nm in order to obtain purely monochromatic ultraviolet radiation. In the illustrated example, the arrangement of the light sources and the filters is identical on the other side of the structure 13 in order to have uniform overall lighting.

The white light source 3 and the monochromatic ultraviolet-type light source 4 emit light rays 12 in the direction of an emission zone 11. The emission zone 11 coincides with the capture field of the image acquisition device 5. The light rays 12 emitted by the white light source 3 and the monochromatic ultraviolet-type light source 4 are projected onto a reflective surface 10, where a cullet 2 is placed.

In the illustrated example, the reflective surface 10 is arranged on a conveyor 8 moving in a direction 9. The light rays emitted by the white light source 3 and by the monochromatic ultraviolet-type light source 4 have a variable behavior when they reach the emission zone where the cullet 2 is placed, as shown in FIG. 2.

Light rays 14 are reflected by the surface 10 in the direction of the image acquisition device 5. These light rays 14 are filtered by an analyzer 18, crossed with the polarizer 16. The association of the polarizer 16 and the analyzer 18 is intended to limit the stray reflections coming from the light rays emitted by the white light source 3, which would make the processing of the image difficult to interpret. The image acquisition device 5 captures an image of the cullet 2 owing to the light rays 14 reflected by the reflective surface 10.

Once the image has been acquired, it is processed by an image processing device 6 electronically connected to the image acquisition device 5. The image processing device 6 comprises a module for detecting the glass-ceramic material 17. In the non-exhaustive example presented here, it is a colorimetric image processing module according to an HSV model, which is configured to analyze the image pixel by pixel or by sets of pixels and to convert these pixels into HSV data. The HSV model colorimetric image processing module is configured such that for each pixel or sets of pixels, a hue datum H is determined for fixed saturation S and value V data. These fixed data here are equal to S=1 and V=0.5.

Each determined hue datum H is then compared with at least one threshold datum. In the example, the hue datum H is compared with a minimum threshold of 50° and a maximum threshold of 70°. In other words, if a pixel or a set of pixels has HSV data equal to 50°≤H≤70°, S=1 and V=0.5, this pixel or set of pixels is considered to correspond to a fragment thought to be glass-ceramic material. This information is communicated either to a user of the system 1 so that he can manually intervene and remove the glass-ceramic fragment from the cullet, or to an automated device allowing the fragments thought to be glass-ceramic materials to be ejected in a targeted manner.

Alternatively, additional colorimetric processing can be implemented. The HSV data of the pixels corresponding to fragments thought to be glass-ceramic materials by the HSV model colorimetric image processing module are then converted into RGB data by means of an RGBmodel colorimetric image processing module 7, comprised in the image processing device 6, which calculates the ratio $$\frac{B}{R}$$

between a blue datum B and a red datum R of the recovered RGB data in order to detect potential false positives resulting from the processing carried out by the module for detecting the glass-ceramic material 17 and to improve the precision of the detection system 1. According to the embodiment, the RGB model colorimetric processing module 7 can also convert the entire image acquired by the image acquisition device 5. The image is then directly transmitted to the RGB model colorimetric processing module 7.

FIG. 2 is a schematic representation of the light radiation from light sources on two different types of glass. For schematic simplification reasons, only two rays from each light source are shown, but in reality the light sources emit in a multitude of directions, for example at an emission angle of 90°. Furthermore, the refraction phenomena of the light rays on the glass fragments are not shown, again for the sake of simplifying the figure.

FIG. 2 shows the white light source 3 and the monochromatic ultraviolet-type light source 4 each emitting their respective light radiation. The white light source 3 emits white light rays 26, shown in solid lines, and the monochromatic ultraviolet-type light source 4 emits ultraviolet rays 25 with a wavelength of 365 nm, shown in dotted lines.

The two light rays meet at the emission zone 11, where here there is a cullet placed on the reflective surface 10. A conventional glass fragment 23 and a glass-ceramic fragment 24 here are present within the cullet.

The conventional glass fragment 23 allows all types of light rays to pass through. Thus, the white light ray 26 and the ultraviolet ray 25 pass through the structure of the conventional glass fragment 23, are reflected by the reflective surface 10 and pass through the structure of the conventional glass fragment 23 again toward the image acquisition device 5.

The glass-ceramic fragment 24 exhibits different optical properties from the conventional glass fragment 23. The glass-ceramic material has the particularity of absorbing a majority of ultraviolet rays, as will be explained in more detail with reference to FIG. 4. The ultraviolet ray 25 therefore does not pass through the structure of the glass-ceramic fragment 24 in its entirety and is absorbed for the most part. In general, an ultraviolet ray with a wavelength of 365 nm is hardly reflected in the direction of the image acquisition device 5 if its trajectory passes through a fragment of glass-ceramic material. Just like for the conventional glass fragment 23, the ray of white light 26 passes through the glass-ceramic fragment 24 and is reflected in the direction of the image acquisition device 5.

Theoretically, the image acquisition device 5 receives all the white light rays 26 coming from the white light source 3 and the ultraviolet rays 25 from the monochromatic ultraviolet-type light source 4 with the exception of the ultraviolet rays 25 having been largely absorbed by the glass-ceramic fragment(s) 24. This double lighting and the partial cut-off of the ultraviolet rays by the glass-ceramic material results in a possible colorimetric analysis on the acquired image because the glass-ceramic material takes on a yellow hue, unlike the rest of the cullet.

FIG. 3 is a schematic representation of the detection method implemented by the system described above.

A step in the scrolling of the conveyor 27 at a given speed involves a movement of one or more cullets on their reflective surface or directly on the reflective mat of the conveyor.

The scrolling of the conveyor 27 generates a step 29 of positioning the cullet in the emission zone. At the same time, a step 28 of emitting the light radiation from the light sources is triggered in order to illuminate the cullet present at the emission zone. The association of the step 29 of positioning the cullet in the emission zone and the step 28 of emitting the light radiation from the light sources leads to a step of acquiring the image 30 by the image acquisition device.

Once the image is captured, a detection method 32 begins. The captured image is subjected to a step of detecting the glass-ceramic material 33, which here, by way of example, is a step of colorimetric processing of the image according to an HSV model. The step of detecting the glass-ceramic material 33 analyzes the image acquired during the step of acquiring the image 30, pixel by pixel or by groups of pixels, by applying a thresholding to this image of H between the values 50° and 70°, so that $50° \leq H \leq 70°$, for defined data S and V. If no pixel or group of pixels corresponds to this threshold, the detection method 32 ends, and a new cycle resumes with a new cullet scrolling on the conveyor.

If one or more pixels, or one or more groups of pixels, correspond to this thresholding of H, then the fragments of the cullet corresponding to these pixels or groups of pixels are theoretically thought to be glass-ceramic fragments. Consequently, the method continues to end with a step of colorimetric processing of the image according to an RGB model 34.

To this end, it is appropriate to provide an RGB model colorimetric image processing module 7 with a processed digital image, resulting from the previous step of detecting the glass-ceramic material, said image particularly comprising at least one group of pixels corresponding to a fragment thought to be glass-ceramic material. In the described example, where the detection step is carried out by a colorimetric analysis of an image acquired from the cullet, the processing of the image is carried out associating the acquired image and a digital marking of the pixels or groups of pixels corresponding to what could be thought to be glass-ceramic material. In examples that are not described but are comprised in the invention, where the detection of the glass-ceramic material is carried out by other methods, a digital image of the cullet is acquired at this stage and is processed to identify, on the image, what could be thought to be glass-ceramic material.

During the step of colorimetric processing of the image according to an RGB model 34, several sub-steps follow one another first, the image is processed according to an RGB model; this may be either the image in its entirety, or only the pixels thought to be glass-ceramic material, that is to say, corresponding to the thresholding of the datum H of the HSV model. This is a sub-step of converting the pixels or groups of pixels of the image into RGB data 36. For each of these pixels, the red datum R and the blue datum B are recovered, the two data being between 0 and 255. The colorimetric image processing module according to an RGB model then calculates a ratio $$\frac{B}{R}$$

corresponding to the blue datum B of a pixel or group of pixels to the red datum R of this same pixel or group of pixels, by means of a sub-step of calculating the ratio 37. Finally, the ratios obtained from each pixels or group of pixels are compared with a threshold value of 0.5 during a ratio comparison sub-step 38. The threshold of $$\frac{B}{R}$$

is set to be greater than 0.5. In other words, if the ratio $$\frac{B}{R}$$

of one or more pixels or of one or more groups of pixels is greater than this threshold value of 0.5, then the corresponding fragment is confirmed as being a glass-ceramic fragment. If this same ratio is less than the threshold value of 0.5, then the corresponding fragment is identified as being a false positive, which is not a glass-ceramic fragment.

All of this information is then transmitted to the tracking calculation step 31. During the tracking calculation step 31, the fragments of interest are targeted, that is to say, the fragments that were thought to be glass-ceramic fragments, following the step of detecting the glass-ceramic material 33 of the cullet, and which were confirmed as such during the step of colorimetric processing of the image according to an RGB model 34. These fragments of interest are tracked by taking into account the movement speed of the cullet as a function of the speed of the conveyor. It is understood that the fragments of interest are targeted in that, from a known position at time t, the system can precisely determine their position at time t+Δt.

Once these fragments of interest are targeted during the tracking calculation step 31, a step then follows of eliminating the glass-ceramic fragments 35, in dotted lines in the figure because they are external to the detection system. The step of eliminating the glass-ceramic fragments 35 can be carried out by means of a blower device, present along the conveyor, downstream of the detection system. Owing to the tracking calculation step 31, the blower device, having received the location information from the calculation module, is activated at the location where the glass-ceramic fragments are located, and at the right time. The glass-ceramic fragments are then expelled from the cullet.

Figure 4:
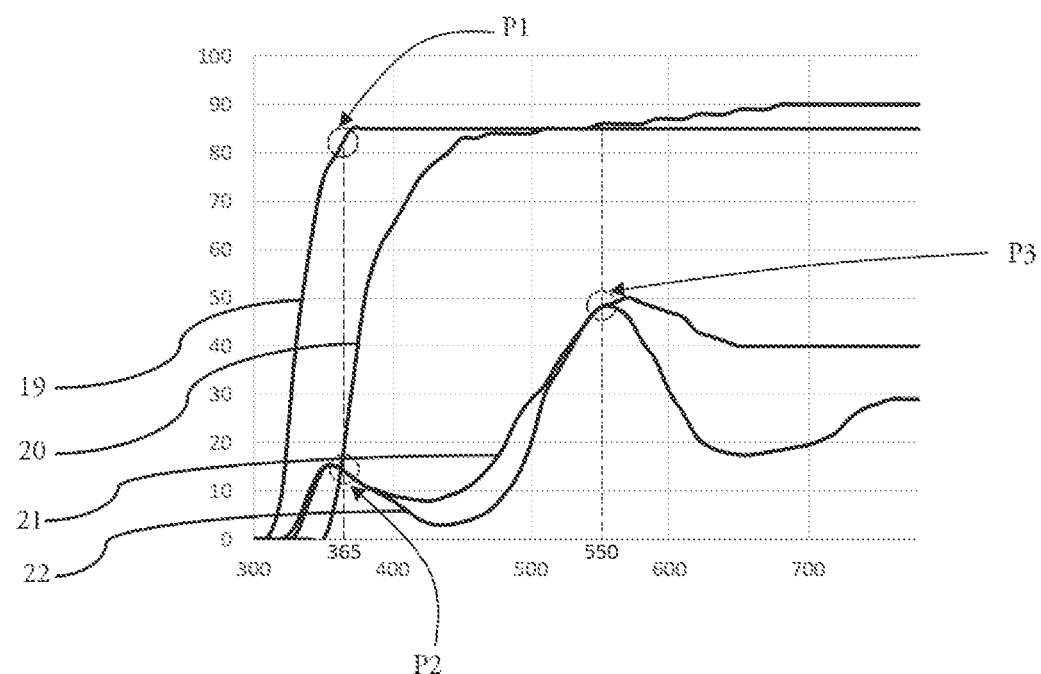

FIG. 4 is a graph showing the percentage of light transmission through different types of glass as a function of the wavelength of the emitted light. Four curves corresponding to four different types of glass appear on this graph: a curve 19 corresponding to conventional glass, i.e. the most common glass, a curve 20 corresponding to glass-ceramic material, a curve 21 corresponding to bottle glass, commonly used to make wine bottles, and a curve 22 corresponding to champagne glass, commonly used to make champagne bottles. Concerning the abscissa axis of the graph, the zone less than 400 nm corresponds to the ultraviolet domain, while the zone greater than 400 nm corresponds to the visible domain.

The conventional glass curve 19 and the glass-ceramic material curve 20 have a similar appearance, namely a curve corresponding to a strong increase in the percentage of light transmission until reaching a level of between 85 and 90% transmission. The major difference between these two curves lies in the fact that the conventional glass curve 19 increases sharply at a shorter wavelength than the abrupt increase in the glass-ceramic material curve 20. Conventional glass therefore has a much higher transmission percentage than that of glass-ceramic material in ultraviolet rays. This difference justifies the use of a monochromatic ultraviolet-type light source with a wavelength of 365 nm, because at this value, the percentage of light transmission of conventional glass is more than 80% (point P1 in FIG. 4), while that of the glass-ceramic material is less than 20% (point P2 in FIG. 4). The image acquisition device therefore captures ultraviolet rays of 365 nm and white light rays of the entire visible spectrum, for example 550 nm, if they have passed through a fragment of conventional glass, but does not capture all of the ultraviolet rays that have encountered a glass-ceramic fragment, since these were largely absorbed by the glass-ceramic material. The lighting conditions of the detection system are such that the glass-ceramic material, through its optical properties, appears with a hue tinged with yellow, corresponding to the selected HSV threshold data, i.e. 50°≤H≤70°. The shade of color corresponding to the glass-ceramic material is due to several factors, in particular the light sources or the type of image acquisition device.

This yellow color is explained by the presence of metal oxides in the composition of the glass-ceramic material, as previously explained. The other two curves, namely the bottle glass curve 21 and the champagne glass curve 22, also have a similar appearance with respect to one another. These are two types of glass whose respective curves are variable, and which transmit light waves with difficulty, never exceeding 50% light transmission (point P3 in FIG. 4). In terms of ultraviolet light, bottle glass and champagne glass have a percentage of light transmission similar to the percentage of light transmission of glass-ceramic material, in particular at 365 nm, which corresponds to the emission wavelength of the monochromatic ultraviolet-type light source. The bottle glass and the champagne glass therefore absorb the ultraviolet rays emitted by the monochromatic ultraviolet-type light source in the same way as the glass-ceramic material. Furthermore, the value of the wavelength where the two types of glass best transmit light is approximately 550-570 nm. In the visible spectrum, this wavelength range corresponds to a yellowish-green color.

To summarize, bottle glass and champagne glass have substantially the same UV absorption properties as glass-ceramic material, and their best percentage of light transmission corresponds to the yellowish-green color, which is a hue quite similar to the thresholding hue of the glass-ceramic material when the image acquired by the image acquisition device is processed by the colorimetric image processing module according to an HSV model. The bottle glass and the champagne glass are therefore two types of glass liable to be false positives, that is to say, they are liable to be thought to be fragments of glass-ceramic materials, when they are not, during analysis by the colorimetric image processing module according to an HSV model. The benefits of the presence of the RGB model colorimetric image processing module then become fully apparent, given that the ratio $$\frac{B}{R}$$

of the bottle glass and the champagne glass is less than 0.5, which makes it possible to deny that they are fragments of glass-ceramic material.

The invention claimed is:

1. A detection method for automated detection of materials of a glass-ceramic type among a cullet, comprising:
    a step of detecting a glass-ceramic material in cullet, during which fragments thought to be glass-ceramic material are identified in the cullet,
    a step of obtaining a digital image resulting from the preceding step of detecting the glass-ceramic material, said image comprising at least one group of pixels corresponding to a fragment thought to be glass-ceramic material,
    a step of colorimetrically processing the digital image, during which at least the group of pixels of said digital image corresponding to fragments thought to be glass-ceramic material is processed by a colorimetric image processing module according to an RGB model,
    wherein the colorimetric image processing module according to an RGB model calculates a ratio B/R between the blue datum B and the red datum R for each pixel or groups of pixels corresponding to fragments of the cullet having been thought to be fragments of glass-ceramic material, the colorimetric image processing module according to an RGB model comparing the ratios B/R between the blue datum B and the red datum R as the ratios were calculated beforehand at a threshold value, the threshold value being 0.5.

2. The detection method according to claim 1, wherein, during the colorimetric digital image processing step, the colorimetric image processing module according to an RGB model processes only the pixels corresponding to fragments thought to be glass-ceramic material.

3. The detection method according to claim 1, wherein the colorimetric image processing module according to an RGB model processes the pixels or groups of pixels converted into RGB data only by considering red R and blue B data of the RGB model.

4. The detection method according to claim 1, wherein the step of detecting the glass-ceramic material is carried out by colorimetric analysis.

5. The detection method according to claim 4, wherein the step of detecting the glass-ceramic material is carried out by colorimetric image processing according to an HSV model.

6. A system for implementing the detection method according to claim 1, comprising a module for detecting the glass-ceramic material and a colorimetric image processing module according to an RGB model.

7. A facility for manufacturing glass fibers, hollow glass or flat glass comprising at least one glass furnace and forming stations, in which cullet is poured into the glass furnace to obtain molten glass intended to supply the forming stations, said facility comprising a system for implementing the detection method according to claim 6, said implementation system being positioned on a path of the cullet toward the glass furnace.

* * * * *